(12) United States Patent
Singh

(10) Patent No.: US 12,278,821 B2
(45) Date of Patent: *Apr. 15, 2025

(54) INTELLIGENT REAL TIME DYNAMIC SMART CONTRACT GENERATION FOR SECURE PROCESSING OF INTERNET OF THINGS (IoT) DEVICE BASED EVENTS

(71) Applicant: Bank of America Corporation, Charlotte, NC (US)

(72) Inventor: Shailendra Singh, Maharashtra (IN)

(73) Assignee: Bank of America Corporation, Charlotte, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 18/419,655

(22) Filed: Jan. 23, 2024

(65) Prior Publication Data

US 2024/0163292 A1 May 16, 2024

Related U.S. Application Data

(63) Continuation of application No. 17/574,771, filed on Jan. 13, 2022, now Pat. No. 11,924,222.

(51) Int. Cl.
*H04L 29/06* (2006.01)
*G16Y 40/35* (2020.01)
*H04L 9/40* (2022.01)
*H04L 67/12* (2022.01)

(52) U.S. Cl.
CPC ............ *H04L 63/12* (2013.01); *G16Y 40/35* (2020.01); *H04L 67/12* (2013.01)

(58) Field of Classification Search
None
See application file for complete search history.

(56) References Cited

U.S. PATENT DOCUMENTS

| | | | |
|---|---|---|---|
| 10,346,406 | B2 | 7/2019 | Booz et al. |
| 10,699,269 | B1 | 6/2020 | Blankstein et al. |
| 10,749,677 | B2 | 8/2020 | Agrawal et al. |
| 10,776,348 | B2 | 9/2020 | Qiu |
| 10,783,190 | B2 | 9/2020 | Qiu |
| 10,924,466 | B2 | 2/2021 | Biyani et al. |
| 10,949,722 | B2 | 3/2021 | Basu |
| 10,972,463 | B2 | 4/2021 | Suthar et al. |
| 11,004,044 | B2 | 5/2021 | Uhr et al. |

(Continued)

*Primary Examiner* — Bradley W Holder
(74) *Attorney, Agent, or Firm* — Banner & Witcoff, Ltd.

(57) ABSTRACT

Aspects of the disclosure relate to computing hardware and software for IoT event processing. A computing platform may monitor communication between an initiating IoT device and a service provider IoT device to detect an event processing request. The computing platform may extract, from the event processing request, event features. The computing platform may feed the event features into a deep learning engine, which may produce a smart contract corresponding to the event processing request. The computing platform may identify, using a distributed ledger, whether the event features comply with the smart contract. Based on identifying that the event features do comply with the smart contract, the computing platform may send, to an event processing system, authorization to process the event processing request, which may cause the event processing system to transfer funds from an initiating user to the service provider.

20 Claims, 8 Drawing Sheets

(56) References Cited

U.S. PATENT DOCUMENTS

| | | |
|---|---|---|
| 11,016,961 B2 | 5/2021 | Qiu |
| 11,055,703 B2 | 7/2021 | Kondo |
| 11,086,743 B2 | 8/2021 | Santhar et al. |
| 11,088,830 B2 | 8/2021 | Gu et al. |
| 11,108,627 B2 | 8/2021 | Smith et al. |
| 11,113,271 B2 | 9/2021 | Zhuo et al. |
| 11,120,145 B2 | 9/2021 | Gurin |
| 11,128,463 B1 | 9/2021 | Thompson et al. |
| 11,128,528 B2 | 9/2021 | Nolan et al. |
| 11,132,756 B2 | 9/2021 | Schuler et al. |
| 11,157,484 B2 | 10/2021 | Padmanabhan et al. |
| 11,195,015 B2 | 12/2021 | Tran et al. |
| 11,216,802 B2 | 1/2022 | Overholser et al. |
| 2020/0195495 A1* | 6/2020 | Parker ................. H04L 41/40 |
| 2021/0289033 A1* | 9/2021 | Ahuja ................ H04L 9/0637 |
| 2022/0150070 A1* | 5/2022 | Nath ................. G06F 11/3055 |
| 2023/0009816 A1* | 1/2023 | Ghosh ................. G06N 20/00 |

* cited by examiner

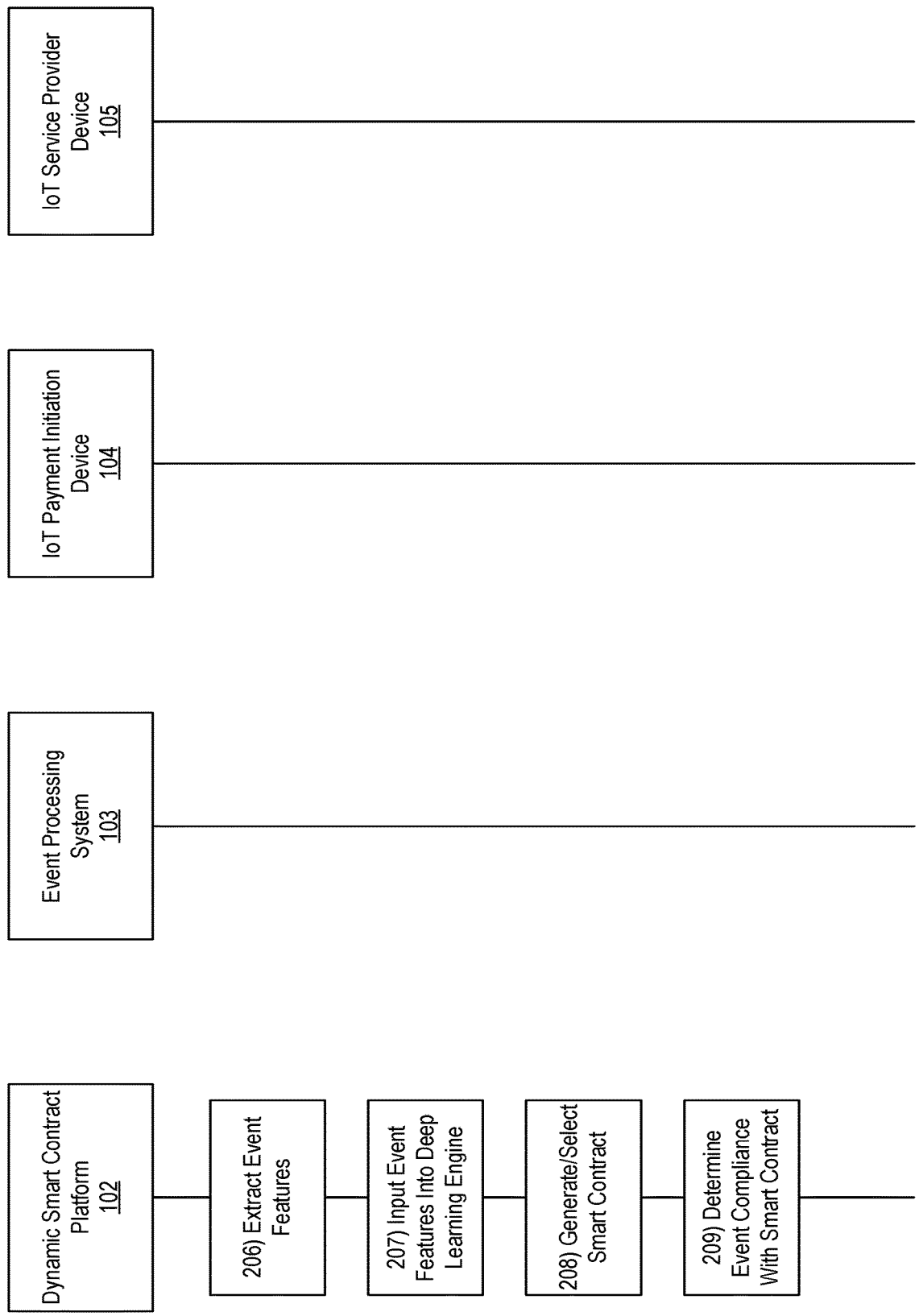

Event Processing Confirmation

405

Congratulations! Your transaction has been processed. Have a great day!

FIG. 4

Error Interface

505

Your transaction was unable to be processed. Please retry your transaction, or contact your financial institution if the problem persists.

Yes    No

FIG. 5

INTELLIGENT REAL TIME DYNAMIC SMART CONTRACT GENERATION FOR SECURE PROCESSING OF INTERNET OF THINGS (IoT) DEVICE BASED EVENTS

CROSS-REFERENCE TO RELATED APPLICATIONS

The present application is a continuation of co-pending U.S. application Ser. No. 17/574,771 filed Jan. 13, 2022, entitled "Intelligent Real Time Dynamic Smart Contract Generation for Secure Processing of Internet of Things (IOT) Device Based Events" the contents of which are hereby incorporated by reference in their entirety.

BACKGROUND

Aspects of the disclosure relate to computing hardware and software, particularly distributed computing hardware and software enabled with Internet of Things (IoT) capabilities. When devices are linked to the IoT or otherwise IoT enabled, events may be automatically triggered by the devices. In some instances, however, such IoT devices may be hacked by a bad actor, and used to initiate unauthorized events. As IoT devices become increasingly prevalent, it may be important to improve authorization measures for IoT devices based events to provide increased security.

SUMMARY

Aspects of the disclosure provide effective, efficient, scalable, and convenient technical solutions that address and overcome the technical problems associated with developing and implementing computer hardware and software that provides secure automated transactions between IoT devices. In accordance with one or more embodiments of the disclosure, a computing platform comprising at least one processor, a communication interface, and memory storing computer-readable instructions may monitor communication between an initiating internet of things (IoT) device and a service provider IoT device to detect an event processing request. The computing platform may extract, from the event processing request, one or more event features. The computing platform may feed the one or more event features into a deep learning engine, which may cause the deep learning engine to produce a smart contract corresponding to the event processing request. The computing platform may identify, using a distributed ledger, whether the one or more event features comply with the smart contract. Based on identifying that the one or more event features do comply with the smart contract, the computing platform may send, to an event processing system, authorization to process the event processing request, which may cause the event processing system to transfer funds from an account of a user corresponding to the initiating IoT device to an account of an enterprise corresponding to the service provider IoT device.

In one or more instances, the initiating IoT device and the service provider IoT device may be one or more of: a mobile device, a refrigerator, a vending machine, a vehicle, an electric meter, or a fuel dispenser. In one or more instances, the one or more event features may include one or more of: a device type of the initiating IoT device, a device type of the service provider IoT device, a mode of payment, a transaction value, a time of the event processing request, a geolocation of the event processing request, a type of event corresponding to the event processing request, additional associated IoT devices, and associated sensors.

In one or more examples, producing the smart contract may include identifying, based on the one or more event features, an existing smart contract stored at a smart contract database. In one or more examples, producing the smart contract may include generating a new smart contract based on the one or more event features.

In one or more instances, the computing platform may store, after generating the new smart contract based on the one or more event features, the new smart contract to the distributed ledger. In one or more instances, the smart contract and the event processing request are written to the distributed ledger.

In one or more examples, identifying that the one or more event features do comply with the smart contract may include receiving, from a quorum number of trusted nodes corresponding to the distributed ledger, an indication that the one or more event features comply with the smart contract. In one or more examples, based on identifying that the one or more event features do not comply with the smart contract, the computing platform may send an error message indicating that authorization to execute the event processing request is not granted.

In one or more instances, feeding the one or more event features into the deep learning engine further may cause the deep learning engine to produce a second smart contract, and identifying whether the one or more event features comply with the smart contract may include identifying whether the one or more event features comply with both the smart contract and the second smart contract. In one or more instances, the event processing request may include an automatically triggered request from the initiating IoT device, where: 1) the automatically triggered request is a request to fill up a fuel tank for a vehicle, 2) the initiating IoT device is the vehicle, and 3) the service provider IoT device is a fuel dispensing system.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2D depict an illustrative event sequence for improved security in processing IoT device based events in accordance with one or more example embodiments;

FIGS. 4 and 5 depict illustrative graphical user interfaces/notifications associated with improved security in processing IoT device based events in accordance with one or more example embodiments.

DETAILED DESCRIPTION

Figure 1A:
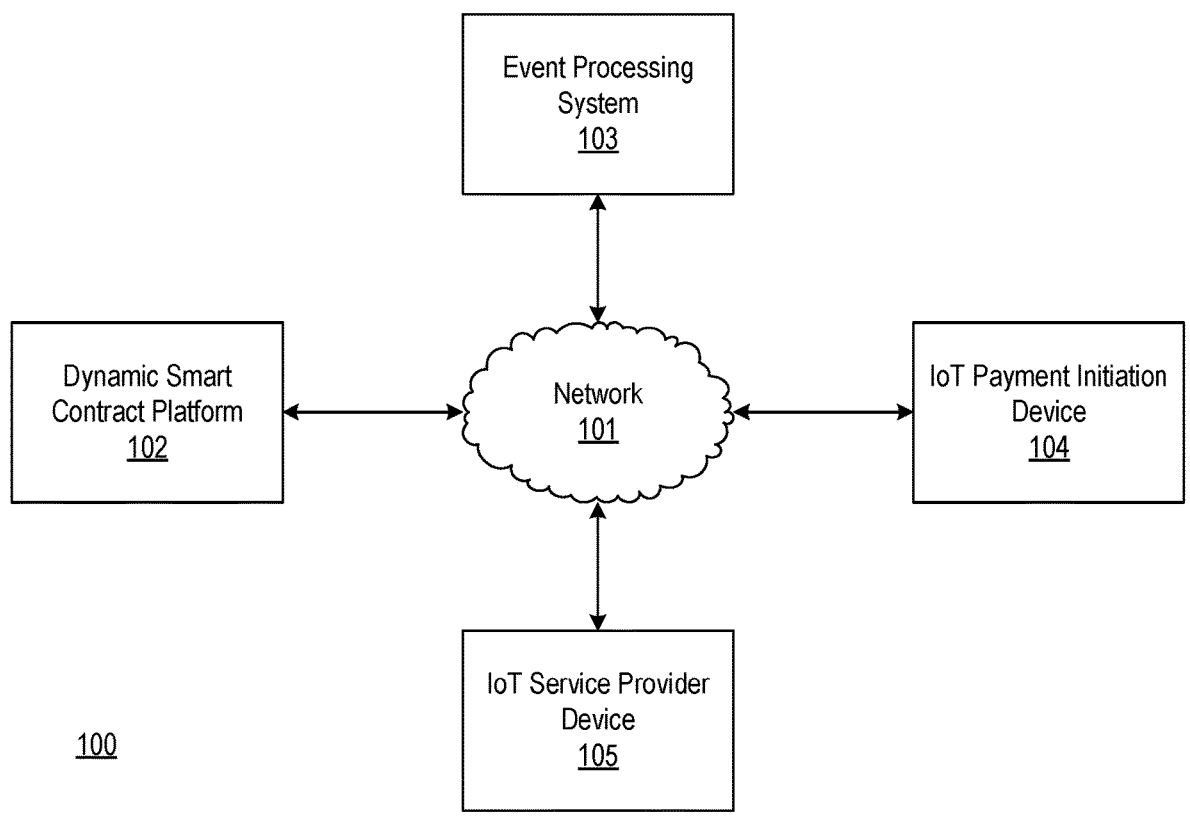
FIGS. 1A-1B depict an illustrative computing environment configured to improve security in processing IoT device based events in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure relate to improved security and verification for transactions between IoT devices. Customers may be able to perform transactions using various instruments that may be linked to the IoT. In some instances, devices may be capable of performing transactions automatically based on sensor information. For example, an IoT enabled car may initiate a transaction automatically at a gas station based on detecting that the fuel has reached a desired level on the tank and detecting that the IoT enabled car is at a location that corresponds to the gas station. In some instances, validating such automated IoT payments to identify whether the payments are actually initiated by a device based on criteria or whether the device has been hacked by a bad actor who initiated the payment may be challenging. Accordingly, there is a need to develop a secure and trusted method that may authenticate and validate automatic IoT device based payments.

Described herein is an intelligent mechanism to authenticate and validate automatic IoT device based payments. For example, based on a payment IoT device, a payment transaction type, temporal or spatial positioning of a payment, an instrument responding to a transaction, and/or other information, the system may create smart contracts on a distributed ledger in real time to authorize IoT devices to execute a transaction. In addition to automatic smart contract creation, the system may also select optimal smart contracts hosted in a distributed ledger that may provide maximum security. This system may include a transaction intension feature extraction engine, a deep learning engine, a smart contract generation engine, a smart contract orchestration engine, and/or other components.

The transaction intension feature extraction engine may extract information about payment device, payment transaction type, temporal and spatial position of payment and instruments responding to a transaction. The deep learning engine may understand a contextual intention about payment transactions being fed in from the feature extraction engine. The smart contract generation engine may automatically assemble components, rules, and/or other conditions to enable payments automatically. The smart contract orchestration engine may ensure monitoring and execution of payment transactions. It may ensure optimal allocation of validation nodes to ensure maximum security.

These and other features are described in further detail below.

Figure 1B:
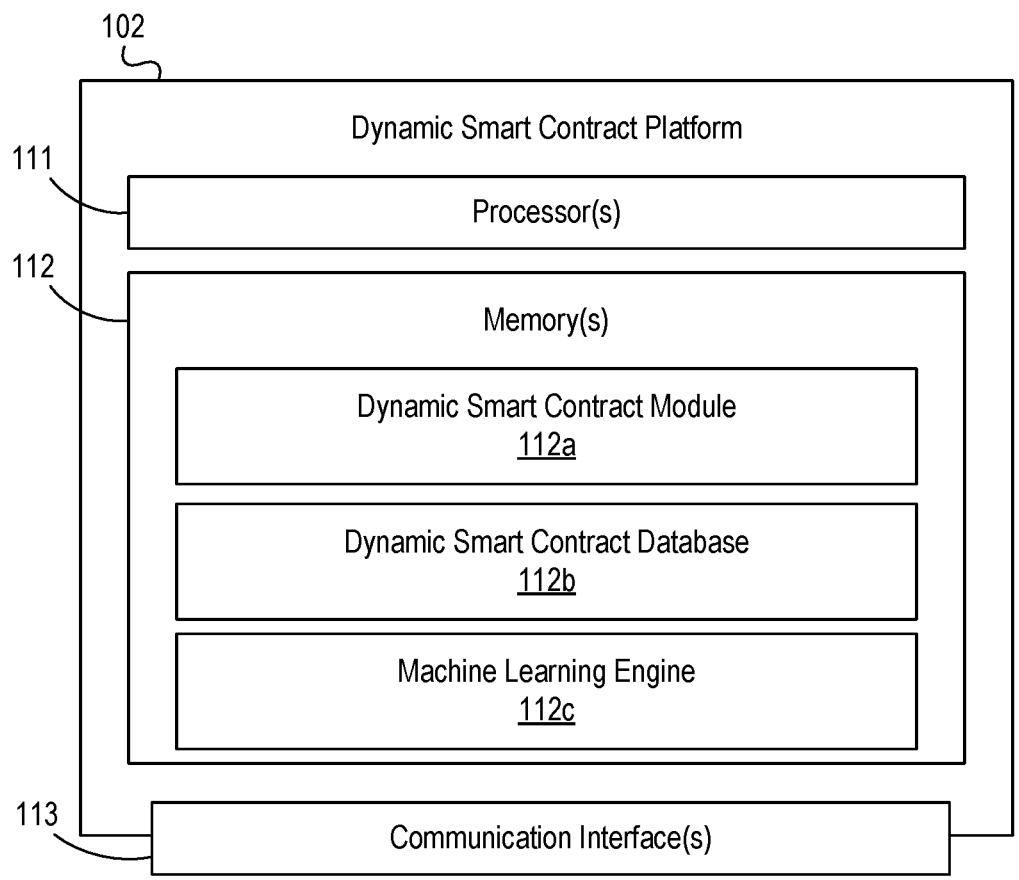

FIGS. 1A-1B depict an illustrative computing environment that provides improved security in processing IoT device based events in accordance with one or more example embodiments. Referring to FIG. 1A, computing environment 100 may include one or more computer systems. For example, computing environment 100 may include dynamic smart contract platform 102, event processing system 103, IoT payment initiation device 104, and IoT service provider device 105.

As described further below, dynamic smart contract platform 102 may be a computer system that includes one or more computing devices (e.g., servers, server blades, or the like) and/or other computer components (e.g., processors, memories, communication interfaces) that may be used to enhance security of IoT device based events as described further below. In these instances, the dynamic smart contract platform 102 may be configured to train, host, and/or otherwise maintain an artificial intelligence engine that may be used to identify, based on features extracted from an event processing request between IoT devices, a corresponding smart contract. The dynamic smart contract platform 102 may further be configured to host, maintain, and/or otherwise use a distributed ledger for real time verification that the event processing request is compliant with the smart contract.

Event processing system 103 may be and/or otherwise include one or more computing devices (e.g., servers, server blades, and/or other devices) and/or other computer components (e.g., processors, memories, communication interfaces) that may be used in event processing. For example, event processing system 103 may be configured to process transactions (which may, in some instances, be automatically triggered by IoT devices). In some instances, the event processing system 103 may be configured to communicate with the dynamic smart contract platform 102 to receive authorization to process or otherwise execute requested events.

IoT payment initiation device 104 may be and/or otherwise include one or more IoT enabled devices such as a laptop computer, desktop computer, mobile device, tablet, smartphone, wearable device, virtual reality device (e.g., a headset or other device), an augmented reality device (e.g., glasses or other device), biometric data collection device, video camera, microphone, kitchen appliance (e.g., stove, refrigerator, microwave oven, dishwasher, or the like), vending machine, vehicle, utility meter (e.g., electricity, water, gas or the like), and/or other device that may be used by an individual to obtain goods or services from an enterprise organization (e.g., purchase groceries, gas, electricity, inventory, and/or other goods/services). In some instances, the IoT payment initiation device 104 may be configured to automatically initiate a transaction (e.g., request an event) based on a detected trigger (e.g., low inventory, proximity, and/or other triggers). In some instances, IoT payment initiation device 104 may be configured to display one or more user interfaces (e.g., event processing interfaces, or the like). Although a single IoT payment initiation device 104 is shown, any number of such devices may be deployed in the systems/methods described below without departing from the scope of the disclosure.

IoT service provider device 105 may be and/or otherwise include one or more IoT enabled devices such as a laptop computer, desktop computer, mobile device, tablet, smartphone, wearable device, virtual reality device (e.g., a headset or other device), an augmented reality device (e.g., glasses or other device), biometric data collection device, video camera, microphone, kitchen appliance (e.g., refrigerator, stove, microwave oven, dishwasher, or the like), vending machine, vehicle, utility meter (e.g., electricity, gas, water, or the like), gas pump, and/or other device that may be used by an enterprise organization to provide goods or services to individuals (e.g., sell groceries, gas, electricity, inventory, and/or other goods/services). In some instances, the IoT service provider device 105 may be configured to receive an automated transaction request (e.g., event processing request) from the IoT payment initiation device 104. In some instances, IoT service provider device 105 may be configured to display one or more user interfaces (e.g., event processing interfaces, or the like). Although a single IoT service provider device 105 is shown, any number of such devices may be deployed in the systems/methods described below without departing from the scope of the disclosure.

Computing environment 100 also may include one or more networks, which may interconnect dynamic smart contract platform 102, event processing system 103, IoT payment initiation device 104, and/or IoT service provider device 105. For example, computing environment 100 may include a network 101 (which may interconnect, e.g., dynamic smart contract platform 102, event processing system 103, IoT payment initiation device 104, and/or IoT service provider device 105).

In one or more arrangements, dynamic smart contract platform 102, event processing system 103, IoT payment initiation device 104, and/or IoT service provider device 105 may be any type of computing device capable of sending and/or receiving requests and processing the requests accordingly. For example, dynamic smart contract platform 102, event processing system 103, IoT payment initiation device 104, IoT service provider device 105, and/or the other systems included in computing environment 100 may, in some instances, be and/or include server computers, desktop computers, laptop computers, enhanced reality devices, tablet computers, smart phones, cameras, microphones, biometric devices, and/or other IoT enabled devices that may include one or more processors, memories, communication interfaces, storage devices, and/or other components. As noted above, and as illustrated in greater detail below, any and/or all of dynamic smart contract platform 102, event processing system 103, IoT payment initiation device 104, and/or IoT service provider device 105, in some instances, be special-purpose computing devices configured to perform specific functions.

Referring to FIG. 1B, dynamic smart contract platform 102 may include one or more processors 111, memory 112, and communication interface 113. A data bus may interconnect processor 111, memory 112, and communication interface 113. Communication interface 113 may be a network interface configured to support communication between dynamic smart contract platform 102 and one or more networks (e.g., network 101, or the like). Memory 112 may include one or more program modules having instructions that when executed by processor 111 cause dynamic smart contract platform 102 to perform one or more functions described herein and/or one or more databases that may store and/or otherwise maintain information which may be used by such program modules and/or processor 111. In some instances, the one or more program modules and/or databases may be stored by and/or maintained in different memory units of dynamic smart contract platform 102 and/or by different computing devices that may form and/or otherwise make up dynamic smart contract platform 102. For example, memory 112 may have, host, store, and/or include dynamic smart contract module 112a, dynamic smart contract database 112b, and/or machine learning engine 112c.

Dynamic smart contract module 112a may have instructions that direct and/or cause dynamic smart contract platform 102 to provide improved processing security for IoT device based events, as discussed in greater detail below. Dynamic smart contract database 112b may store information used by dynamic smart contract module 112a and/or dynamic smart contract platform 102 in application of advanced techniques to provide improved processing security, and/or in performing other functions. Machine learning engine 112c may be used by the dynamic smart contract module 112a and/or the dynamic smart contract platform 102 to train, maintain, and/or otherwise refine a deep learning engine that may be used to provide enhanced processing security.

Figure 2A:
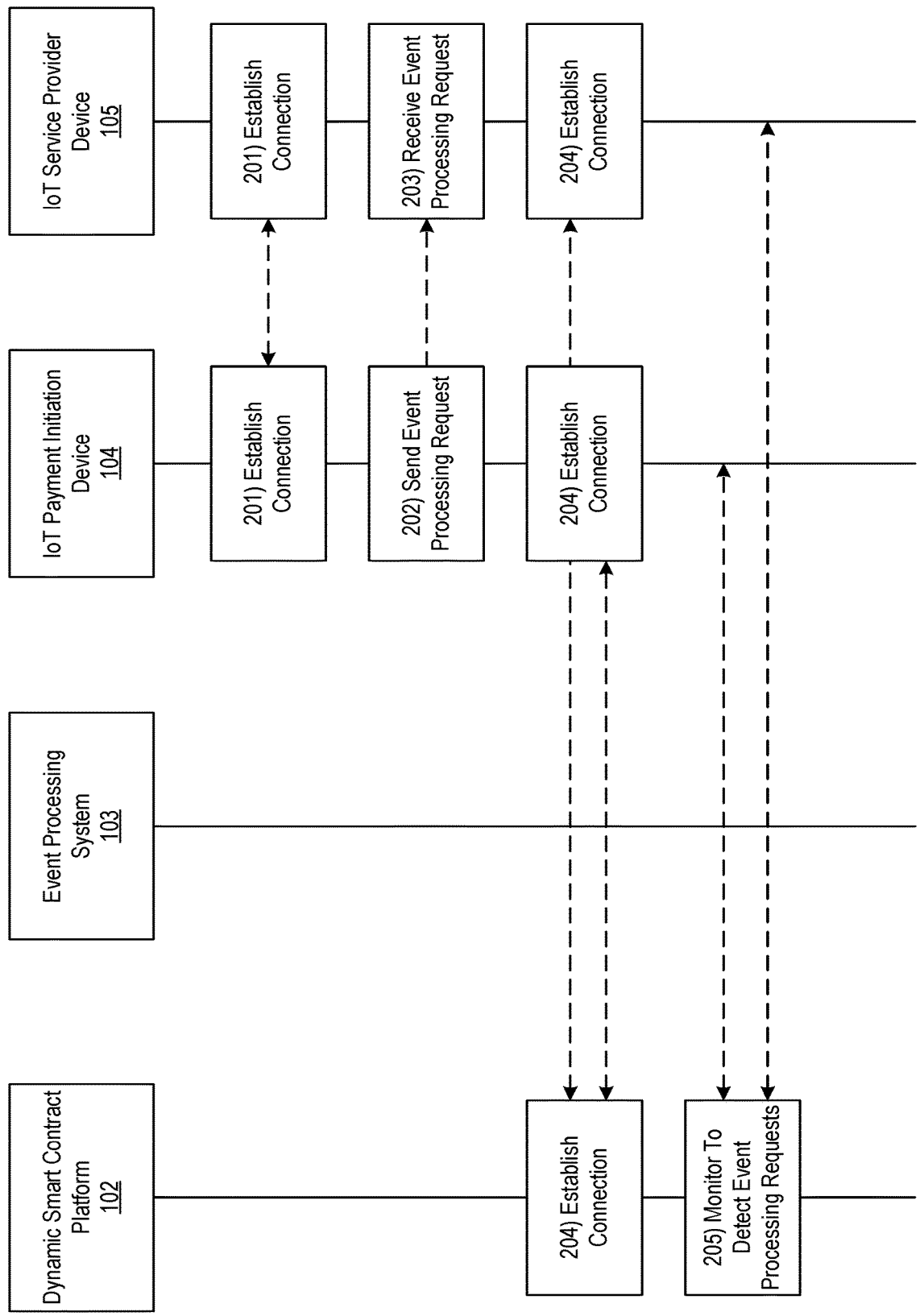

FIGS. 2A-2D depict an illustrative event sequence for improved security in processing IoT device based events in accordance with one or more example embodiments. Referring to FIG. 2A, at step 201, the IoT payment initiation device 104 may establish a connection with the IoT service provider device 105. For example, the IoT payment initiation device 104 may establish a first wireless data connection with the IoT service provider device 105 to link the IoT payment initiation device 104 to the IoT service provider device 105. (e.g., in preparation for sending an event processing request). In some instances, the IoT payment initiation device 104 may identify whether a connection is already established with the IoT service provider device 105. If a connection is already established with the IoT service provider device 105, the IoT payment initiation device 104 might not re-establish the connection. If a connection is not yet established with the IoT service provider device 105, the IoT payment initiation device 104 may establish the first wireless data connection as described herein.

At step 202, the IoT payment initiation device 104 may send an event processing request to the IoT service provider device 105. For example, the IoT payment initiation device 104 may send a transaction request for goods or services (e.g., refill inventory, provide electricity, fill a fuel tank, order food, and/or other goods/services). In some instances, the IoT payment initiation device 104 may automatically send the event processing request based on or in response to a detected trigger (e.g., a proximity, level of inventory, fuel level, and/or other triggers). As a particular example, the IoT payment initiation device 104 may be an IoT enabled vehicle, which may detect that it is approaching a fueling station and a fuel level of the vehicle is below a threshold fuel level. In some instances, the IoT payment initiation device 104 may send the event processing request to the IoT service provider device 105 while the first wireless data connection is established. Although the IoT payment initiation device 104 that sends the event processing request is shown as a single device, this is for illustrative purposes only, and the IoT payment initiation device 104 may be or otherwise include any number of IoT enabled devices without departing from the scope of the disclosure.

In some instances, such IoT payment initiation devices may be accessed by an unauthorized user and used to process unauthorized events (e.g., transactions). Accordingly, to prevent such unauthorized activity, the systems and methods described below may improve security in IoT device based transactions to prevent the processing of any such unauthorized events.

At step 203, the IoT service provider device 105 may receive the event processing request. For example, an IoT enabled device may receive the request for a particular good or service from the IoT payment initiation device 104. To continue with the specific example described above, the IoT service provider device 105 may be an IoT enabled fuel pump, and it may receive a request from the IoT payment initiation device 104 to dispense fuel. In some instances, the IoT service provider device 105 may receive the event processing request while the first wireless data connection is established.

At step 204, the dynamic smart contract platform 102 may establish connections with the IoT payment initiation device 104 and/or the IoT service provider device 105. For example, the dynamic smart contract platform 102 may establish second and/or third wireless data connections with the IoT payment initiation device 104 and/or the IoT service provider device 105 to link the dynamic smart contract platform 102 to the IoT payment initiation device 104 and/or the IoT service provider device 105 (e.g., in preparation for monitoring these IoT devices for event processing requests). In some instances, the dynamic smart contract platform 102 may identify whether a connection is already established with the IoT payment initiation device 104 and/or the IoT service provider device 105. If connections are already established with the IoT payment initiation device 104 and/or the IoT service provider device 105, the dynamic smart contract platform 102 might not re-establish these connections. Otherwise, if connections are not yet established with the IoT payment initiation device 104 and/or the IoT service provider device 105, the dynamic smart contract platform 102 may establish the second and/or third wireless data connections as described herein.

At step 205, the dynamic smart contract platform 102 may monitor the IoT payment initiation device 104 and the IoT service provider device 105. For example, the dynamic smart contract platform 102 may monitor communications between the IoT payment initiation device 104 and the IoT service provider device 105 (which may, e.g., be enabled based on the IoT capabilities of the IoT payment initiation device 104 and/or the IoT service provider device 105) to detect whether an event processing request (e.g., the event processing request sent at step 202) has been sent from the IoT payment initiation device 104 to the IoT service provider device 105. For example, the dynamic smart contract platform 102 may detect that a request for fuel has been sent from an IoT enabled vehicle to an IoT enable fuel pump (as described in the example above). Once an event processing request is detected by the dynamic smart contract platform 102, the dynamic smart contract platform 102 may proceed to step 206.

Referring to FIG. 2B, at step 206, the dynamic smart contract platform 102 may extract features of the event processing request detected at step 205. For example, the dynamic smart contract platform 102 may extract one or more of: a device type of the initiating IoT device, a device type of the service provider IoT device, a mode of payment (e.g., fiat currency, cryptocurrency, and/or other payment modes), a transaction value, a time of the event processing request, a geo-location of the event processing request, a type of event corresponding to the event processing request, additional associated IoT devices, associated sensors, and/or other information. In some instances, the dynamic smart contract platform 102 may use one or more machine learning algorithms to extract features relevant to the requested event. For example, the dynamic smart contract platform 102 may be trained to identify features, for various events, that may be used to select smart contracts relevant to determining authenticity of the corresponding event.

At step 207, the dynamic smart contract platform 102 may input the extracted event features into a deep learning engine. For example, the dynamic smart contract platform 102 may have previously performed initial training for the deep learning engine by providing a dataset that includes various event features and smart contracts to be invoked based upon each of the various event features. In doing so, the dynamic smart contract platform 102 may have trained the deep learning engine to output one or more smart contracts corresponding to an input event feature. For example, based on context of a requested event (e.g., a transaction), the deep learning engine may be able to identify criteria to be satisfied for the transaction to be executed.

In some instances, the dynamic smart contract platform 102 may store these smart contracts in a smart contract database. In some instances, these smart contracts may define criteria to be met in order for an event processing request to be approved. For example, the smart contracts may define various thresholds and/or other criteria to be satisfied to warrant approval of the corresponding event processing request. In some instances, the criteria defined by the smart contracts may be specific to a user, geographic region, and/or otherwise.

Once the extracted event features are input into the deep learning engine, the dynamic smart contract platform 102 may use the deep learning engine to produce or otherwise output one or more smart contracts (e.g., a first smart contract, a second contract, and/or any other number of smart contract). For example, the dynamic smart contract platform 102 may identify, based on identifying the relationship and proximity between a vehicle and a fuel pump, that a fuel tank level of the vehicle should be below a particular threshold, the price of fuel should be below a particular threshold, and/or identify other parameters or constraints on the sale to be satisfied prior to authorization.

At step 208, the dynamic smart contract platform 102 may generate or otherwise select the one or more smart contracts identified by the deep learning engine. For example, the dynamic smart contract platform may select the one or more smart contracts, if they were output by the deep learning engine. Additionally or alternatively, if smart contracts were not identified by the deep learning engine, the dynamic smart contract platform 102 may generate the one or more smart contracts accordingly. In some instances, the selected or otherwise generated smart contracts may be written to a distributed ledger (e.g., a blockchain, holochain, and/or distributed other ledger).

At step 209, the dynamic smart contract platform 102 may identify whether or not the requested event complies with the one or more smart contracts. For example, the dynamic smart contract platform 102 may seek approval from a quorum number of approvers (e.g., trusted nodes of the distributed ledger) of the one or more smart contracts through the distributed ledger. In some instances, these trusted nodes may be or otherwise include other IoT devices. By implementing the distributed ledger to determine event compliance, the dynamic smart contract platform 102 may effectively utilize two layers of security to prevent fraudulent or otherwise unauthorized events from being processed. In some instances, multiple smart contracts may be selected for different groups of IoT devices corresponding to the IoT payment initiation device 104. In these instances, the dynamic smart contract platform 102 may confirm compliance of each smart contract. For example, smart contracts may be used to verify objective parameters of the transaction. Second, however, an additional security layer may be provided by requesting approval from the quorum of trusted nodes, indicating that each node of the quorum verifies compliance with the smart contracts (e.g., this offers additional security beyond a single verification of the smart contract).

If a quorum number of approval indications are not received (e.g., recorded to the distributed ledger or otherwise communicated from the approvers to the dynamic smart contract platform 102), the dynamic smart contract platform 102 may proceed to step 217. Otherwise, if a quorum number of approval indications are received (e.g., recorded to the distributed ledger or otherwise communicated from the approvers to the dynamic smart contract platform 102), the dynamic smart contract platform 102 may proceed to step 210.

Figure 2C:
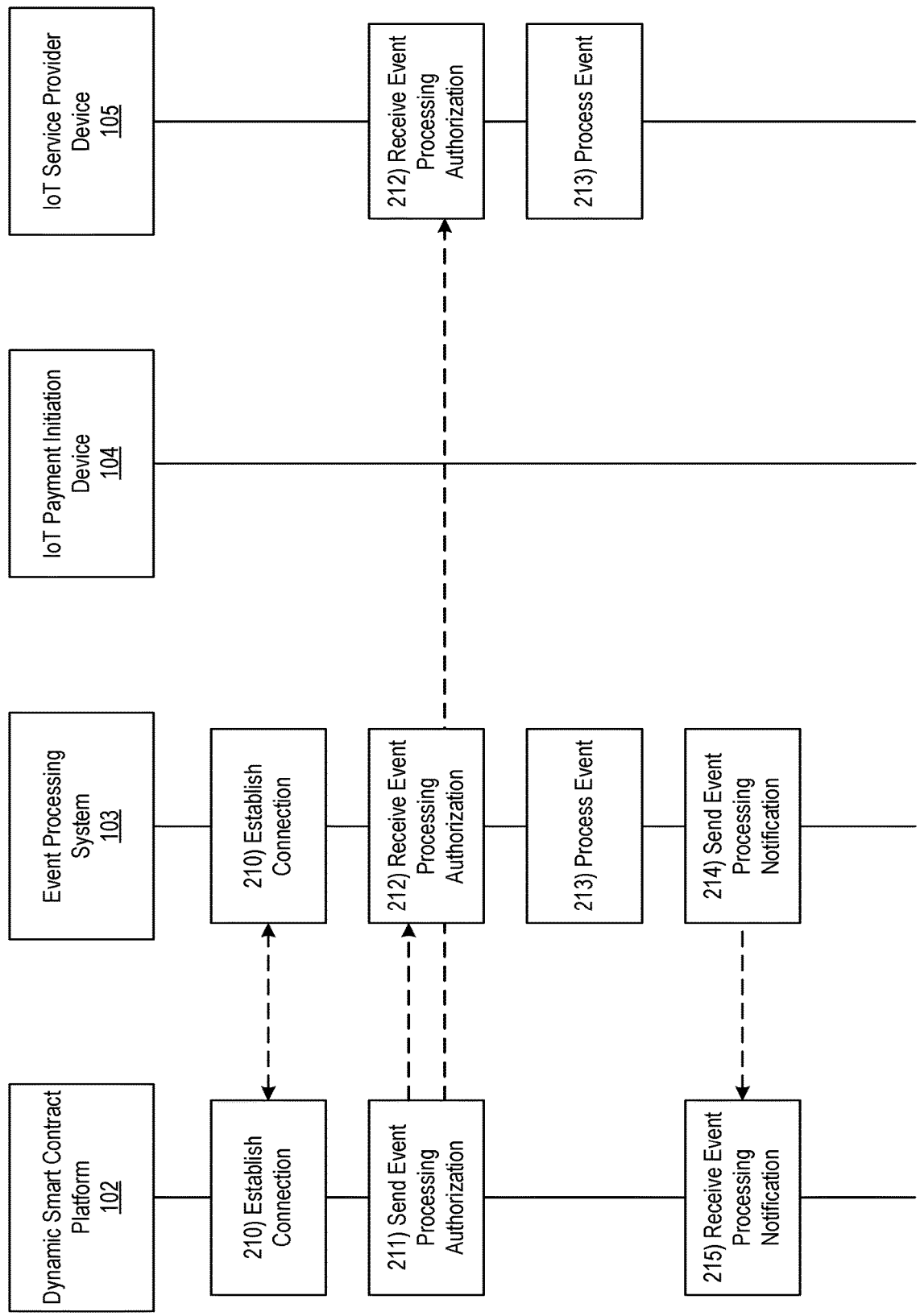

Referring to FIG. 2C, at step 210, the dynamic smart contract platform 102 may establish a connection with the event processing system 103. For example, the dynamic smart contract platform 102 may establish a fourth wireless data connection with the event processing system 103 to link the dynamic smart contract platform 102 with the event processing system 103 (e.g., in preparation for providing authorization to process the requested event). In some instances, the dynamic smart contract platform 102 may identify whether or not a connection is already established with the event processing system 103. If a connection is already established with the event processing system 103, the dynamic smart contract platform 102 might not re-establish the connection. If a connection is not yet established with the event processing system 103, the dynamic smart contract platform 102 may establish the fourth wireless data connection as described herein.

At step 211, the dynamic smart contract platform 102 may send one or more event processing authorization commands to the event processing system 103 and/or the IoT service provider device 105. For example, the dynamic smart contract platform 102 may send one or more event processing authorization commands to the event processing system 103 authorizing the event processing system 103 to transfer funds (or otherwise execute a transaction) from an account corresponding to the IoT payment initiation device 104 into an account corresponding to the IoT service provider device 105. Additionally or alternatively, the dynamic smart contract platform 102 may send one or more event processing authorization commands to the IoT service provider device 105 authorizing the IoT service provider device 105 to dispense or otherwise provide a good or service requested by the event processing request. In some instances, the event processing system 103 and/or the IoT service provider device 105 may send the one or more event processing authorization commands to the event processing system 103 and/or the IoT service provider device 105 via the communication interface 113 and while the third and/or fourth wireless data connections are established.

At step 212, the event processing system 103 and/or the IoT service provider device 105 may receive the one or more event processing authorization commands sent at step 211. In some instances, the event processing system 103 and/or the IoT service provider device 105 may receive the one or more event processing authorization commands while the third and/or fourth wireless data connections are established.

At step 213, based on or in response to the one or more event processing authorization commands, the event processing system 103 and/or the IoT service provider device 105 may process the requested event. For example, the event processing system 103 may transfer funds from an account of the IoT payment initiation device 104 to an account of the IoT service provider device 105. Additionally or alternatively, the IoT service provider device 105 may dispense or otherwise provide goods or services requested in the event processing request. For example, the IoT service provider device 105 may dispense fuel to the IoT payment initiation device 104, and the event processing system 103 may cause a transfer of funds accordingly.

At step 214, the event processing system 103 may send an event processing notification to the dynamic smart contract platform 102. For example, the event processing system 103 may send a notification to the dynamic smart contract platform 102 indicating that the requested event has been processed. In some instances, the dynamic smart contract platform 102 may send the event processing notification to the dynamic smart contract platform 102 while the fourth wireless data connection is established.

At step 215, the dynamic smart contract platform 102 may receive the event processing notification sent at step 214. For example, the dynamic smart contract platform 102 may receive the event processing notification via the communication interface 113 and while the fourth wireless data connection is established.

Figure 2D:
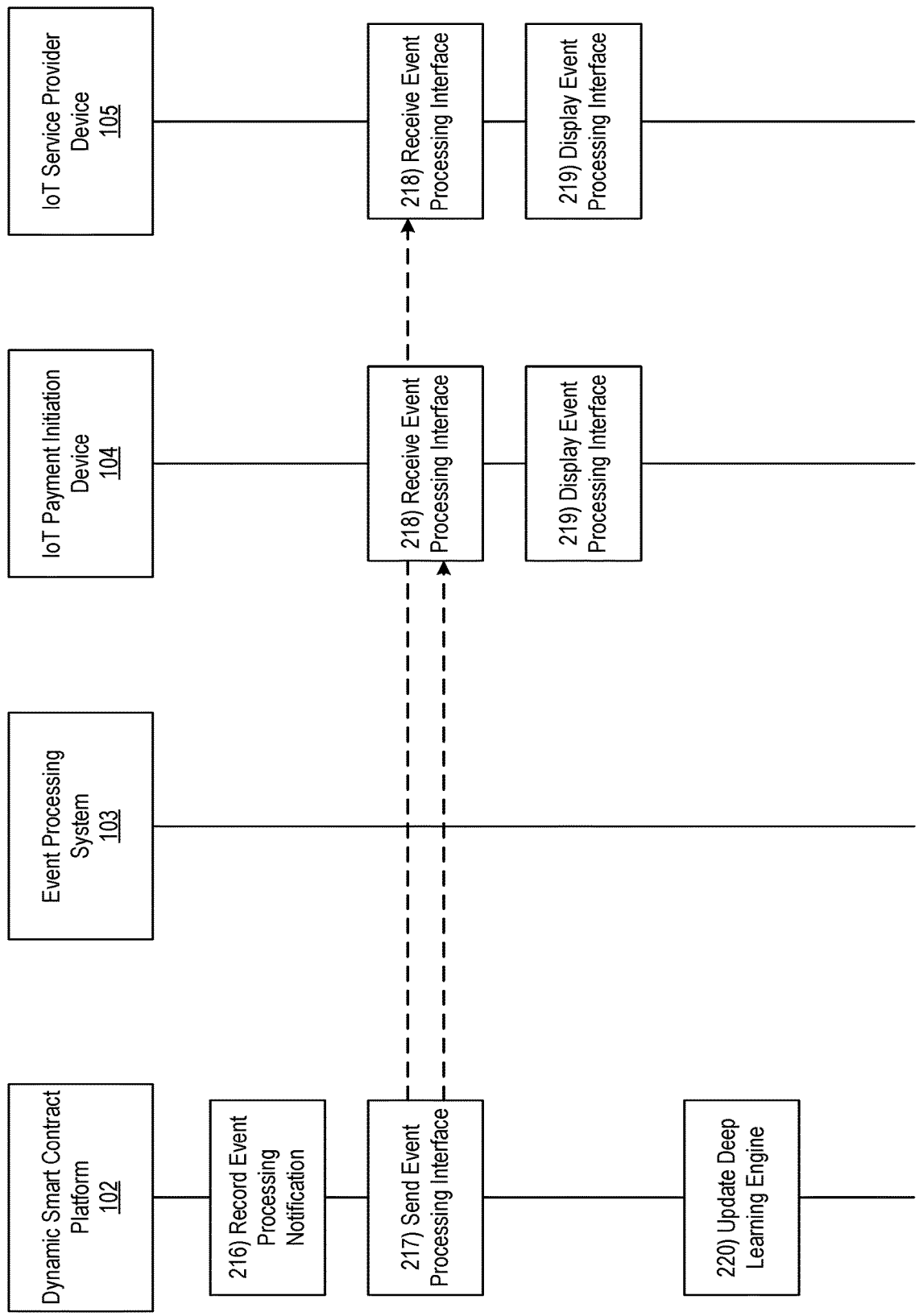

Referring to FIG. 2D, at step 216, the dynamic smart contract platform 102 may record the event processing notification on the distributed ledger. For example, the dynamic smart contract platform 102 may record details of the requested event (which may, e.g., be and/or include the event features extracted above at step 206). Additionally or alternatively, the dynamic smart contract platform 102 may record that the requested event was successfully processed.

At step 217, the dynamic smart contract platform 102 may send an event processing interface to the IoT payment initiation device 104 and/or the IoT service provider device 105 for display. In some instances, the dynamic smart contract platform 102 may send the event processing interface to the IoT payment initiation device 104 and/or the IoT service provider device 105 via the communication interface 113 and while the second and/or third wireless data connections are established. In some instances, the dynamic smart contract platform 102 may also send one or more commands directing the IoT payment initiation device 104 and/or the IoT service provider device 105 to display the event processing interface.

At step 218, IoT payment initiation device 104 and/or the IoT service provider device 105 may receive the event processing interface. For example, the IoT payment initiation device 104 and/or the IoT service provider device 105 may receive the event processing interface while the second and/or third wireless data connections are established.

At step 219, based on or in response to the one or more commands directing the IoT payment initiation device 104 and/or the IoT service provider device 105 to display the event processing interface, the IoT payment initiation device 104 and/or the IoT service provider device 105 may display the event processing interface. For example, if the requested event was successfully processed, the IoT payment initiation device 104 and/or the IoT service provider device 105 may display a graphical user interface similar to graphical user interface 405, which is illustrated in FIG. 4. Alternatively, if the requested event was not successfully processed, the IoT payment initiation device 104 and/or the IoT service provider device 105 may display a graphical user interface similar to graphical user interface 505, which is illustrated in FIG. 5.

At step 220, the dynamic smart contract platform 102 may dynamically update or otherwise refine the deep learning engine based on the event features input and the one or more smart contracts that were output. For example, the dynamic smart contract platform 102 may update the deep learning engine based on any newly generated smart contracts. Additionally or alternatively, the dynamic smart contract platform 102 may update the deep learning engine based on whether or not the requested event was successfully processed, customer complaints, and/or other feedback information. For example, the dynamic smart contract platform 102 may adjust one or more thresholds, values, and/or other constraints of the smart contracts. In doing so, the dynamic smart contract platform 102 may use feedback to dynamically improve processing security of IoT device based events by improving the selection of applicable smart contracts, and refining the constraints of those smart contracts accordingly.

Figure 3:
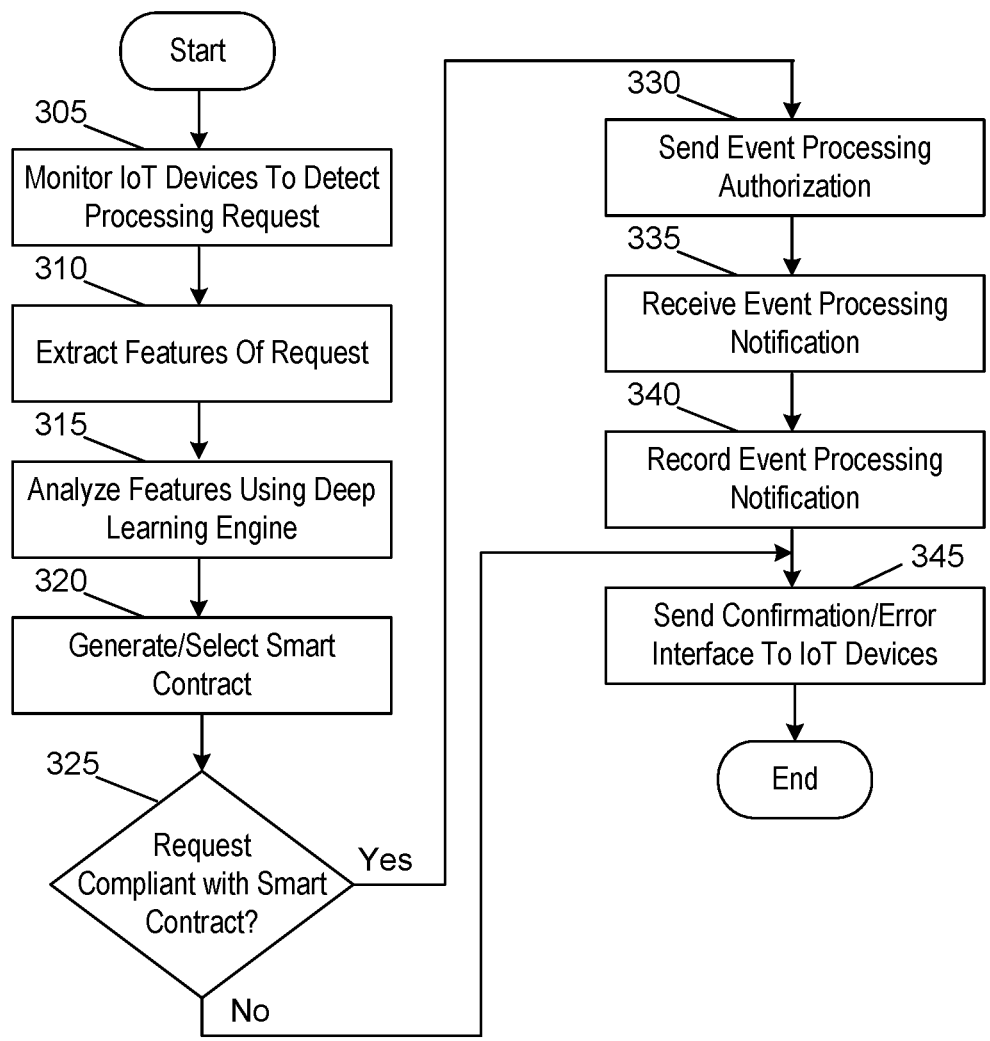
FIG. 3 depicts an illustrative method for improved security in processing IoT device based events in accordance with one or more example embodiments.

FIG. 3 depicts an illustrative method for improved security in processing IoT device based events in accordance with one or more example embodiments. Referring to FIG. 3, at step 305, a computing platform having at least one processor, a communication interface, and memory may monitor IoT devices to detect an event processing request. At step 310, the computing platform may extract one or more event features from the event processing request. At step 315, the computing platform may analyze the one or more event features using a deep learning engine. At step 320, the computing platform may generate or otherwise select one or more smart contracts. At step 325, the computing platform may identify whether the event processing request is compliant with the one or more smart contracts. If the computing platform identifies that the event processing request is compliant with the one or more smart contracts, the computing platform may proceed to step 330. Otherwise, if the computing platform identifies that the event processing request is not compliant with the one or more smart contracts, the computing platform may proceed to step 345.

At step 330, the computing platform may send one or more event processing authorization commands to an event processing system and/or IoT devices. At step 335, the computing platform may receive an event processing notification. At step 340, the computing platform may record the event processing notification on a distributed ledger. At step 345, the computing platform may send a confirmation or error interface to the IoT devices along with commands to display the confirmation or error interface.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the at least one processor, cause the computing platform to:
   extract, from an event processing request from an initiating internet of things (IoT) device, one or more event features;
   produce, using a deep learning engine and based on the one or more event features, a smart contract corresponding to the event processing request;
   identify, using a distributed ledger, whether the one or more event features comply with the smart contract; and
   based on identifying that the one or more event features do comply with the smart contract, send, to an event processing system, authorization to process the event processing request, wherein sending the authorization to process the event processing request causes the event processing system to transfer funds from an account of a user corresponding to the initiating IoT device to an account of an enterprise corresponding to a service provider IoT device.

2. The computing platform of claim 1, wherein the initiating IoT device and the service provider IoT device comprise one or more of: a mobile device, a refrigerator, a vending machine, a vehicle, an electric meter, or a fuel dispenser.

3. The computing platform of claim 1, wherein the one or more event features comprise one or more of: a device type of the initiating IoT device, a device type of the service provider IoT device, a mode of payment, a transaction value, a time of the event processing request, a geo-location of the event processing request, a type of event corresponding to the event processing request, additional associated IoT devices, and associated sensors.

4. The computing platform of claim 1, wherein producing the smart contract comprises identifying, based on the one or more event features, an existing smart contract stored at a smart contract database.

5. The computing platform of claim 1, wherein producing the smart contract comprises generating a new smart contract based on the one or more event features.

6. The computing platform of claim 5, wherein the memory stores additional computer-readable instructions that, when executed by the at least one processor, cause the computing platform to:
store, after generating the new smart contract based on the one or more event features, the new smart contract to the distributed ledger.

7. The computing platform of claim 1, wherein the smart contract and the event processing request are written to the distributed ledger.

8. The computing platform of claim 7, wherein identifying that the one or more event features do comply with the smart contract comprises receiving, from a quorum number of trusted nodes corresponding to the distributed ledger, an indication that the one or more event features comply with the smart contract.

9. The computing platform of claim 1, wherein the memory stores additional computer-readable instructions that, when executed by the at least one processor, cause the computing platform to:
based on identifying that the one or more event features do not comply with the smart contract, sending an error message indicating that authorization to execute the event processing request is not granted.

10. The computing platform of claim 1, wherein feeding the one or more event features into the deep learning engine further causes the deep learning engine to produce a second smart contract, and wherein identifying whether the one or more event features comply with the smart contract comprises identifying whether the one or more event features comply with both the smart contract and the second smart contract.

11. The computing platform of claim 1, wherein the event processing request comprises an automatically triggered request from the initiating IoT device, wherein:
the automatically triggered request comprises a request to fill up a fuel tank for a vehicle,
the initiating IoT device comprises the vehicle, and
the service provider IoT device comprises a fuel dispensing system.

12. The computing platform of claim 1, wherein the memory stores additional computer-readable instructions that, when executed by the at least one processor, cause the computing platform to:
monitor communication between the initiating IoT device and the service provider IoT device to detect the event processing request.

13. The computing platform of claim 1, wherein the memory stores additional computer-readable instructions that, when executed by the at least one processor, cause the computing platform to:
feed the one or more event features into the deep learning engine, wherein producing the smart contract is based on feeding the one or more event features into the deep learning engine.

14. A method comprising:
at a computing platform comprising at least one processor, a communication interface, and memory:
extracting, from an event processing request from an initiating internet of things (IoT) device, one or more event features;
producing, using a deep learning engine and based on the one or more event features, a smart contract corresponding to the event processing request;
identifying, using a distributed ledger, whether the one or more event features comply with the smart contract; and
based on identifying that the one or more event features do comply with the smart contract, sending, to an event processing system, authorization to process the event processing request, wherein sending the authorization to process the event processing request causes the event processing system to transfer funds from an account of a user corresponding to the initiating IoT device to an account of an enterprise corresponding to a service provider IoT device.

15. The method of claim 14, wherein the initiating IoT device and the service provider IoT device comprise one or more of: a mobile device, a refrigerator, a vending machine, a vehicle, an electric meter, or a fuel dispenser.

16. The method of claim 14, wherein the one or more event features comprise one or more of: a device type of the initiating IoT device, a device type of the service provider IoT device, a mode of payment, a transaction value, a time of the event processing request, a geo-location of the event processing request, a type of event corresponding to the event processing request, additional associated IoT devices, and associated sensors.

17. The method of claim 14, wherein producing the smart contract comprises identifying, based on the one or more event features, an existing smart contract stored at a smart contract database.

18. The method of claim 14, wherein producing the smart contract comprises generating a new smart contract based on the one or more event features.

19. The method of claim 18, further comprising:
storing, after generating the new smart contract based on the one or more event features, the new smart contract to the distributed ledger.

20. One or more non-transitory computer-readable media storing instructions that, when executed by a computing platform comprising at least one processor, a communication interface, and memory, cause the computing platform to:
extract, from an event processing request from an initiating internet of things (IoT) device, one or more event features;
produce, using a deep learning engine and based on the one or more event features, a smart contract corresponding to the event processing request;
identify, using a distributed ledger, whether the one or more event features comply with the smart contract; and
based on identifying that the one or more event features do comply with the smart contract, send, to an event processing system, authorization to process the event processing request, wherein sending the authorization to process the event processing request causes the event processing system to transfer funds from an account of a user corresponding to the initiating IoT device to an account of an enterprise corresponding to a service provider IoT device.

* * * * *